United States Patent
Gu et al.

(10) Patent No.: US 9,557,601 B2
(45) Date of Patent: Jan. 31, 2017

(54) BACKLIGHT MODULE AND DISPLAY APPARATUS

(75) Inventors: Yubo Gu, Shenzhen (CN); Pei Jia, Shenzhen (CN); Liu yang Yang, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 145 days.

(21) Appl. No.: 13/636,701

(22) PCT Filed: Jul. 31, 2012

(86) PCT No.: PCT/CN2012/079417
§ 371 (c)(1),
(2), (4) Date: Sep. 24, 2012

(87) PCT Pub. No.: WO2014/012277
PCT Pub. Date: Jan. 23, 2014

(65) Prior Publication Data
US 2016/0274415 A1 Sep. 22, 2016

(30) Foreign Application Priority Data
Jul. 19, 2012 (CN) .......................... 2012 1 0250272

(51) Int. Cl.
*G02F 1/1335* (2006.01)
*F21V 8/00* (2006.01)
(52) U.S. Cl.
CPC ....... *G02F 1/133611* (2013.01); *G02B 6/0021* (2013.01); *G02B 6/0068* (2013.01); *G02F 1/133602* (2013.01)

(58) Field of Classification Search
CPC . G02F 1/133611; G02B 6/0021; G02B 6/0068
USPC ................................................ 362/97.3, 97.1
See application file for complete search history.

(56) References Cited

U.S. PATENT DOCUMENTS

| 8,109,644 | B2 * | 2/2012 | Bierhuizen | G02B 6/0018 362/249.02 |
| 8,231,237 | B2 * | 7/2012 | Zimmermann | G02B 6/0021 362/249.02 |
| 8,625,051 | B2 * | 1/2014 | He | G02B 6/0021 349/62 |
| 8,641,219 | B1 * | 2/2014 | Johnson | G02B 6/0021 362/97.3 |
| 2009/0128735 | A1 * | 5/2009 | Larson | G02B 6/0018 349/62 |
| 2009/0129063 | A1 * | 5/2009 | Park | G02B 3/0037 362/97.3 |
| 2010/0259470 | A1 * | 10/2010 | Kohtoku | G02B 6/0021 345/102 |

(Continued)

FOREIGN PATENT DOCUMENTS

JP      10-2007-0080024       * 8/2007

*Primary Examiner* — Laura Tso
(74) *Attorney, Agent, or Firm* — Mark M. Friedman

(57) ABSTRACT

The present invention provides a backlight module and a display apparatus. The backlight module comprises a substrate, a plurality of light sources disposed on the substrate; and a light guide sheet disposed on the substrate, wherein the light guide sheet includes a plurality of curved recesses, and the light sources are received in the curved recesses. The present invention can decrease an amount of the light sources.

18 Claims, 6 Drawing Sheets

(56) References Cited

U.S. PATENT DOCUMENTS

2015/0124484 A1\* 5/2015 Gu .................... G02F 1/133603
                                                    362/613
2016/0041326 A1\* 2/2016 Chang ................. G02B 6/0021
                                                    362/97.3

\* cited by examiner

BACKLIGHT MODULE AND DISPLAY APPARATUS

FIELD OF THE INVENTION

The present invention relates to a field of a liquid crystal display technology, and more particularly to a backlight module and a display apparatus using the same.

BACKGROUND OF THE INVENTION

Liquid crystal displays (LCDs) have been widely applied in electrical products. Currently, most of LCDs are backlight type LCDs which comprise a liquid crystal panel and a backlight module. According to the position of the backlight source, the backlight module can be a side-light type or a direct-light type in order to provide the liquid crystal panel with backlight. Taking the direct-light type backlight module for example, it uses lamps or light bars to be light sources for providing the liquid crystal panel with backlight.

However, in the side-light type backlight module, the light sources are disposed at one side of a light guide plate, and thus it is required to reserve a space in a bezel of the backlight module for arranging the light sources, adversely hampering a slim bezel design. Moreover, in the direct-light type backlight module, it is required to use numerous light sources to form a plane light source, thereby increasing the cost and energy consumption of the light sources.

As a result, it is necessary to provide a backlight module and a display apparatus to solve the problems existing in the conventional technologies, as described above.

SUMMARY OF THE INVENTION

The invention provides a backlight module and a display apparatus to solve the problem of forming the plane light source existing in the conventional backlight module.

A primary object of the present invention is to provide a backlight module, and the backlight module comprises: a substrate; a plurality of light sources disposed on the substrate; and a light guide sheet disposed on the substrate, wherein the light guide sheet includes a plurality of curved recesses with an oval-shaped too projection, and the light sources are received in the curved recesses, and a longitudinal direction of the curved recesses is parallel to the a longitudinal direction of the substrate.

Another object of the present invention is to provide a backlight module, and the backlight module comprises: a substrate; a plurality of light sources disposed on the substrate; and a light guide sheet disposed on the substrate, wherein the light guide sheet includes a plurality of curved recesses, and each of the curved recesses has a first length and a second length, and the first length is greater than the second length, and a direction of the first length is parallel to a longitudinal direction of the substrate.

Still another object of the present invention is to provide a display apparatus, and the display apparatus comprises a display panel and a backlight module. The backlight module comprises: a substrate; a plurality of light sources disposed on the substrate; and a light guide sheet disposed on the substrate, wherein the light guide sheet includes a plurality of curved recesses with an oval-shaped top projection, and the light sources are received in the curved recesses, and a longitudinal direction of the curved recesses is parallel to the a longitudinal direction of the substrate.

In one embodiment of the present invention, each of the curved recesses has a first length and a second length, and the first length is greater than the second length, and a direction of the first length is parallel to the longitudinal direction of the substrate.

In one embodiment of the present invention, the first length is in a range of 1 mm to 5 cm.

In one embodiment of the present invention, the second length is in a range of 1 mm to 3 cm.

In one embodiment of the present invention, a ratio of the first length to the second length is identical to an aspect ratio of the substrate.

In one embodiment of the present invention, the ratio of the first length to the second length is of 4:3 or 16:9.

In one embodiment of the present invention, a first space between each adjacent two of the light sources along the direction of the first length is larger than a second space between each adjacent two of the light sources along a direction of the second length.

In one embodiment of the present invention, each of the curved recesses receives one of the light sources.

In one embodiment of the present invention, each of the curved recesses receives at least two of the light sources.

The backlight module and the display apparatus of the present invention can use the light guide sheet to uniform the light of the light sources for forming a uniform plane light source. Moreover, with the use of the curved recesses of the light guide sheet, the light rays of the light sources can be diffused and uniformed according to the aspect ratio or the scale of the display apparatus for decreasing the amount of the light sources, so as to decrease the cost and energy consumption of the backlight module.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

Figure 1:
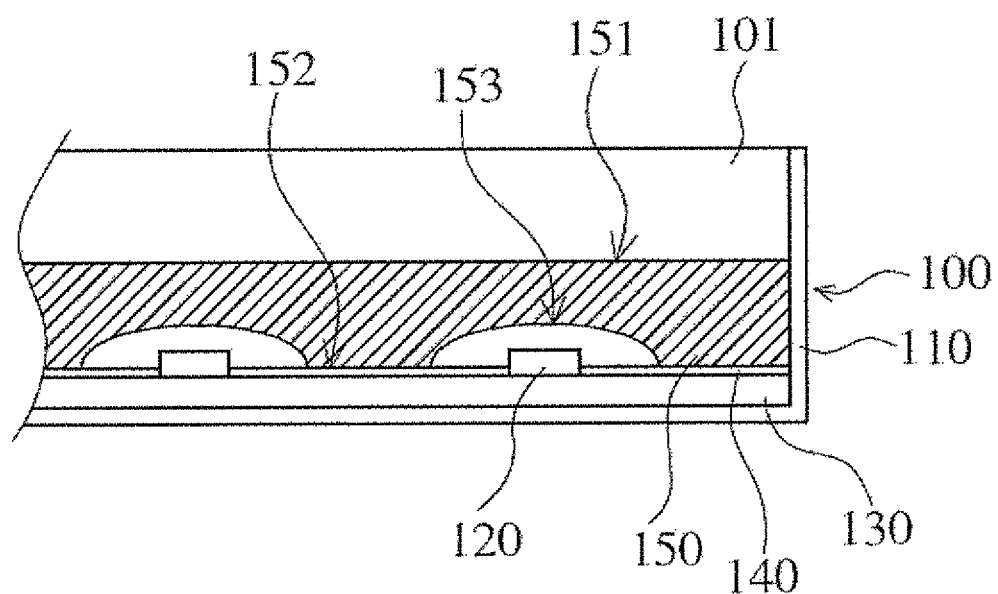
FIG. 1 is a cross-sectional view showing a backlight module and a display panel according to one embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

The drawings and description are to be regarded as illustrative in nature and not restrictive. Like reference numerals designate like elements throughout the specification. In addition, the size and thickness of each component shown in the drawings are arbitrarily shown for understanding and ease of description, but the present invention is not limited thereto.

In the drawings, the thickness of layers, films, panels, regions, etc., are exaggerated for clarity. In the drawings, for understanding and ease of description, the thicknesses of some layers and areas are exaggerated. It will be understood that, when an element such as a layer, film, region, or substrate is referred to as being "on" another element, it can be directly on the other element or intervening elements may also be present.

In addition, in the specification, unless explicitly described to the contrary, the word "comprise" and variations such as "comprises" or "comprising" will be understood to imply the inclusion of stated elements but not the exclusion of any other elements. Furthermore, in the specification, "on" implies being positioned above or below a target element and does not imply being necessarily positioned on the top on the basis of a gravity direction.

Referring to FIG. 1, a cross-sectional view showing a backlight module and a display panel according to one embodiment of the present invention is illustrated. The backlight module 100 of the present embodiment can be disposed opposite to a display panel 101, such as a liquid crystal display (LCD) panel, thereby forming a display apparatus, such an LCD apparatus. The backlight module 100 may comprises a back bezel 110, a plurality of light sources 120, a substrate 130, a reflective layer 140 and a light guide sheet 150.

Referring to FIG. 1 again, the back bezel 110 of the present embodiment may be made of an opaque material, such as plastic, metal or any combination material thereof for carrying the light sources 120, the substrate 130 and the light guide sheet 150. The light sources 120 are disposed on the substrate 130 for providing light to the display panel 101. In this embodiment, the light sources 120 may be point light sources, such as light emitting diodes (LEDs), organic light emitting diodes (OLEDs) or electro-luminescence (EL) devices. In this embodiment, the light sources 120 may be LED chips which are arranged on the substrate 130, and there is a predetermined space between each adjacent two of the light sources 120.

Referring to FIG. 1 again, the substrate 130 is a rectangular plate. In this embodiment, the substrate 130 may be a circuit board, such as a printed circuit board (PCB) or a flexible printed circuit (FPC), disposed on the back bezel 110 and electrically connected to the light sources 120 for controlling them to emit light.

Referring to FIG. 1 again, the reflective layer 140 can be disposed on a surface of the substrate 130 and formed between or around the light sources 120. The reflective layer 140 may be a reflective plate, a reflective sheet or a reflective coated layer for reflecting light. The reflective layer 140 may be made of a highly reflective material, such as Ag, Al, Au, Cr, Cu, In, Ir, Ni, Pt, Re, Rh, Sn, Ta, W, Mn, any alloy combination thereof, white reflective paint with etiolation-resistant and heat-resistant properties or any combination thereof.

Figure 2A:
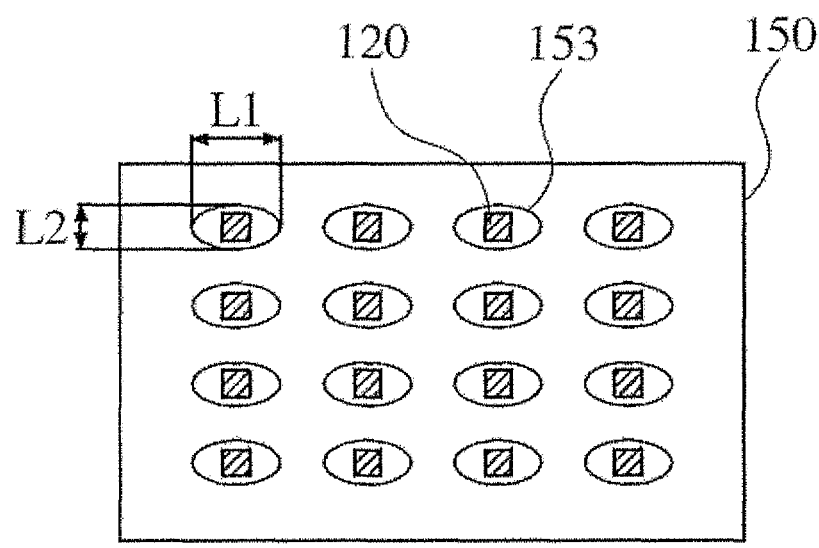
FIG. 2A and FIG. 2B are schematic diagrams showing the light guide sheet and the light sources according to one embodiment of the present invention.
Figure 2B:
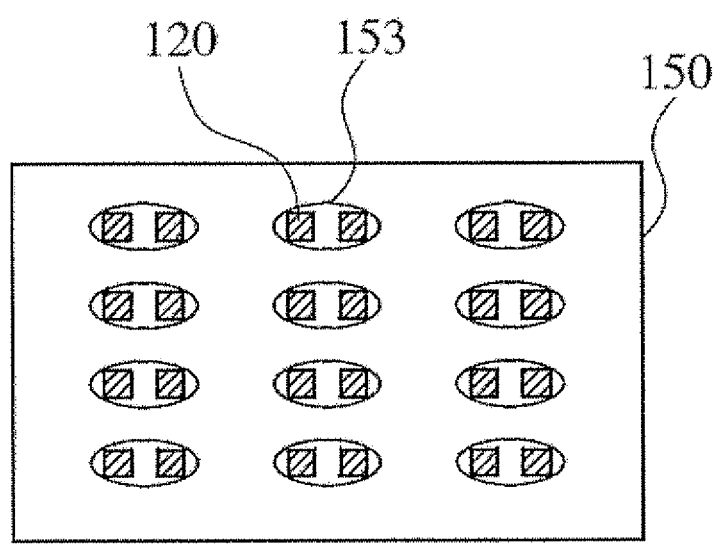

Referring to FIG. 2A and FIG. 2B, schematic diagrams showing the light guide sheet and the light sources according to one embodiment of the present invention are illustrated. The light guide sheet 150 may be made as one-piece by using injection molding, extrusion molding, stamping, cutting, casting, machining, compression molding or forging. The material of the light guide sheet 150 may be glass, photo-curable resin, polymethylmethacrylate (PMMA) or polycarbonate (PC). The light guide sheet 150 includes a light output surface 151, a bottom surface 152, a plurality of curved recesses 153 with an oval-shaped top projection. The light output surface 151 is formed at one side of the light guide sheet 150 and faces to the liquid crystal display panel 101 for allowing the light rays of the light sources 120 to be outputted thereto. The bottom surface 152 is formed at another side of the light guide sheet 150 and faces to the substrate 130. The curved recesses 153 are formed on the bottom surface 152 for receiving and packaging the light sources 120, and each of the curved recesses 153 can act as a concave lens for diffusing the light of the light sources 120. An opening width of each of the curved recesses 153 is larger than a width of each of the light sources 120 for receiving the light sources 120 in the curved recesses 153 of the light guide sheet 150. According to a user's practical requirement, the shape or size of the curved recesses 153 is adjustable for forming an optimum and uniform plane light source. Referring to FIG. 2A again, one of the light sources 120 can be received in one of the curved recesses 153. In another embodiment, referring to FIG. 2B again, at least two of the light sources 120 can be received in one of the curved recesses 153.

Referring to FIG. 1 and FIG. 2A again, the curved recesses 153 can have a curved profile and act as concave lenses for diffusing the light rays of the light sources 120. The curved recesses 153 can have elliptic openings, and each of the elliptic openings of the curved recesses 153 has a first length L1 and a second length L2, wherein the first length L1 is greater than the second length L2. The first length L1 may be the longest length of the curved recesses 153, for example, in the range of 1 mm to 5 cm or in the range of 5 mm to 3 cm. Therefore, the first length L1 is parallel to a longitudinal direction of the curved recesses 153, and the longitudinal direction of the curved recesses 153 is parallel to a longitudinal direction of the substrate 130. The second length L2 may be vertical to the first length L1, for example, in the range of 1 mm to 3 cm or in the range of 5 mm to 2 cm. A ratio of the first length L1 to the second length 12 can be identical to an aspect ratio of the rectangular substrate 130, such as 4:3 or 16:9.

When the light sources 120 emit light, the light rays of the light sources 120 can be diffused and uniformed by the curved recesses 153 of the light guide sheet 150 for mixing light, so as to provide a uniform plane light source to the liquid crystal display panel 101. At this time, in comparison with the direction of the second length L2, the curved recesses 153 have a longer light diffusion length along the direction of the first length L1 (the longitudinal direction), thereby having a greater diffusion effect. The curved recesses 153 can have different lengths, and the longitudinal direction of each of the curved recesses 153 can be parallel to the longitudinal direction of the substrate 130 for laterally diffusing more light rays along the longitudinal direction of the substrate 130 (i.e. the longitudinal direction of the display apparatus), thereby providing sufficient light rays along the longitudinal direction, as well as relatively decreasing an arrangement number of the light sources 120 along the longitudinal direction. In this case, a first space between each adjacent two of the light sources 120 along the direction of the first length L1 is larger than a second space between each adjacent two of the light sources 120 along the direction of the second length L2. Therefore, with the use of the curved recesses 153 of different lengths, the light rays of the light sources 120 can be diffused and uniformed according to the aspect ratio or a scale of the display apparatus for decreasing the amount of the light sources 120, so as to decrease the cost and energy consumption of the backlight module 100.

Figure 3A:
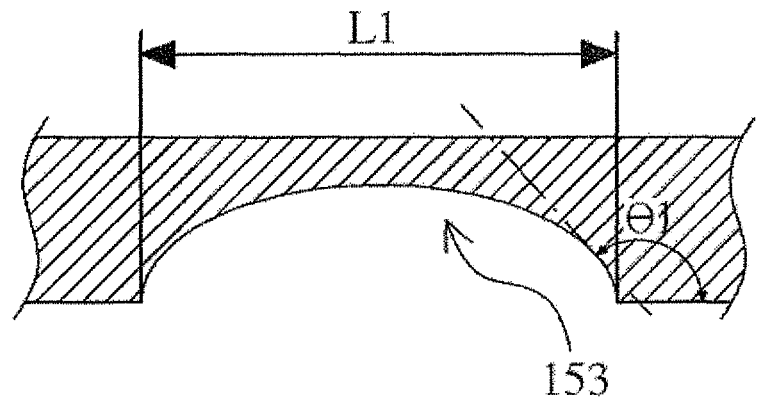
FIG. 3A and FIG. 3B are cross-sectional views showing the curved recesses according to one embodiment of the present invention.
Figure 3B:
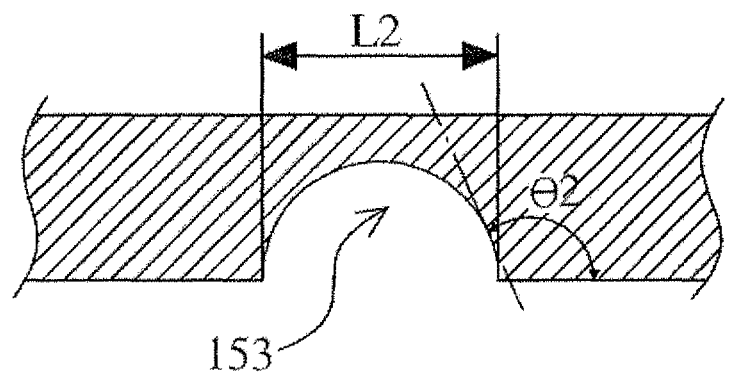

Referring to FIG. 3A and FIG. 3B, cross-sectional views showing the curved recesses according to one embodiment of the present invention are illustrated. In addition, along the direction of the first length L1, there is a first angle θ1 between a tangent line of the curved recesses 153 and the bottom surface 152, such as in the range of 110 degrees to 175 degrees. Along the direction of the second length L2, there is a second angle θ2 between another tangent line of the curved recesses 153 and the bottom surface 152, such as in the range of 90 degrees to 165 degrees. In this case, the first angle θ1 is greater than the second angle θ2, such that the curved recesses 153 can have different profiles along the directions of the first length L1 and the second length L2, respectively, thereby having different lateral diffusion effects.

Figure 4:
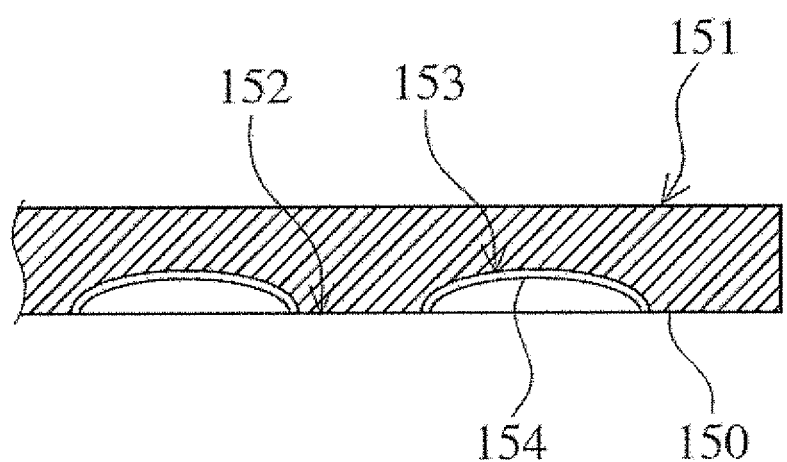
FIG. 4 is a partially cross-sectional view showing a light guide sheet according to another embodiment of the present invention.

Referring to FIG. 4, a partially cross-sectional view showing a light guide sheet according to another embodiment of the present invention is illustrated. In another embodiment, the light guide sheet 150 can further comprise a phosphor layer 154. The phosphor layer 154 is formed on an inner surface of each of the recesses 153 and excited by the light of the light sources 120 to emit a visible light. Therefore, the luminous efficiency or light color of the light sources 120 can be improved by using the phosphor layer 154.

When assembling the display apparatus of the present embodiment, the substrate 130 with the light sources 120 arranged thereon is first disposed on the back bezel 110. Subsequently, the light guide sheet 150 can be disposed on the substrate 130. At this time, the light sources 120 are correspondingly received and packaged in the curved recesses 153 of the light guide sheet 150. Subsequently, the display panel 101 is disposed above the light guide sheet 150, so as to achieve the display apparatus.

Therefore, with use of the light guide sheet 150 of the present embodiment, the light of the light sources 120 of the backlight module 100 can be uniformed for forming a uniform plane light source. The light of the light sources 120 is pre-mixed by the concave lenses of the light guide sheet 150, thereby reducing the required light mixing space and a thickness of the backlight module 100. Furthermore, with the use of the curved recesses 153 of different lengths, the light rays of the light sources 120 can be diffused and uniformed according to the aspect ratio or the scale of the display apparatus for decreasing the amount of the light sources 120, so as to decrease the cost and energy consumption of the backlight module 100.

Figure 5:
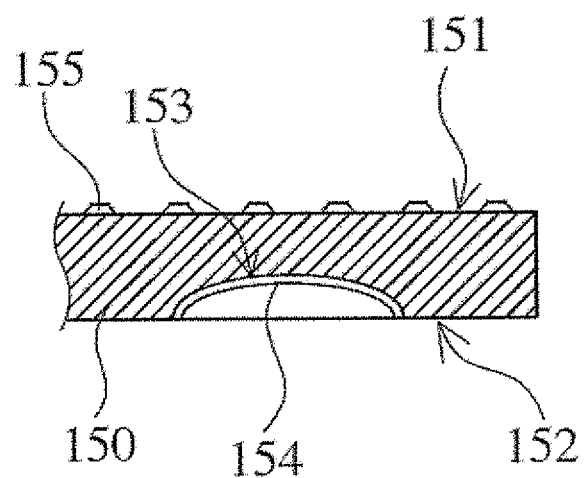
FIG. 5 is a partially cross-sectional view showing a light guide sheet according to still another embodiment of the present invention.

Referring to FIG. 5, a partially cross-sectional view showing a light guide sheet according to still another embodiment of the present invention is illustrated. In still another embodiment, the light output surface 151 of the light guide sheet 150 can include a plurality of protruding structures 155 to modify the direction of light, thereby condensing light and enhancing the brightness thereof, wherein the protruding structures 155 may be prism-shaped structures or semicircular structures. Furthermore, the light output surface 151 may include a cloudy surface or a plurality of scattering patterns to uniform the light outputted from the light sources 120, i.e. the situation of mura is prevented.

As described above, the backlight module and the display apparatus of the present invention can use the light guide sheet to uniform the light of the light sources for forming a uniform plane light source. In addition, with the use of the curved recesses of the light guide sheet, the light rays of the light sources can be diffused and uniformed according to the aspect ratio or the scale of the display apparatus for decreasing the amount of the light sources, so as to decrease the cost and energy consumption of the backlight module.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A backlight module, comprising:
   a substrate;
   a plurality of light sources disposed on the substrate; and
   a light guide sheet disposed on the substrate, wherein the light guide sheet includes a plurality of curved recesses, and each of the curved recesses has a first length and a second length, and the first length is greater than the second length, and a direction of the first length is parallel to a longitudinal direction of the substrate.

2. The backlight module according to claim 1, wherein the first length is in a range of 1 mm to 5 cm.

3. The backlight module according to claim 1, wherein the second length is in a range of 1 mm to 3 cm.

4. The backlight module according to claim 2, wherein a ratio of the first length to the second length is identical to an aspect ratio of the substrate.

5. The backlight module according to claim 4, wherein the ratio of the first length to the second length is of 4:3 or 16:9.

6. The backlight module according to claim 2, wherein a first space between each adjacent two of the light sources along the direction of the first length is larger than a second space between each adjacent two of the light sources along a direction of the second length.

7. The backlight module according to claim 1, wherein each of the curved recesses receives one of the light sources.

8. The backlight module according to claim 1, wherein each of the curved recesses receives at least two of the light sources.

9. A backlight module, comprising:
   a substrate;
   a plurality of light sources disposed on the substrate; and
   a light guide sheet disposed on the substrate, wherein the light guide sheet includes a plurality of curved recesses with an oval-shaped top projection, and the light sources are received in the curved recesses, and a longitudinal direction of the curved recesses is parallel to the a longitudinal direction of the substrate.

10. The backlight module according to claim 9, wherein each of the curved recesses has a first length and a second length, and the first length is greater than the second length, and a direction of the first length is parallel to the longitudinal direction of the substrate.

11. The backlight module according to claim 10, wherein the first length is in a range of 1 mm to 5 cm.

12. The backlight module according to claim 10, wherein the second length is in a range of 1 mm to 3 cm.

13. The backlight module according to claim 10, wherein a ratio of the first length to the second length is identical to an aspect ratio of the substrate.

14. The backlight module according to claim 13, wherein the ratio of the first length to the second length is of 4:3 or 16:9.

15. The backlight module according to claim 10, wherein a first space between each adjacent two of the light sources along the direction of the first length is larger than a second space between each adjacent two of the light sources along a direction of the second length.

16. The backlight module according to claim 9, wherein each of the curved recesses receives one of the light sources.

17. The backlight module according to claim 9, wherein each of the curved recesses receives at least two of the light sources.

18. A display apparatus, comprising:
a display panel; and
a backlight module comprising:
a substrate;
a plurality of light sources disposed on the substrate; and
a light guide sheet disposed on the substrate, wherein the light guide sheet includes a plurality of curved recesses with an oval-shaped top projection, and the light sources are received in the curved recesses, and a longitudinal direction of the curved recesses is parallel to the a longitudinal direction of the substrate.

* * * * *